(12) United States Patent
Suzuki

(10) Patent No.: US 7,530,416 B2
(45) Date of Patent: May 12, 2009

(54) MOTOR-DRIVEN WHEEL DRIVING APPARATUS

(75) Inventor: Minoru Suzuki, Iwata (JP)

(73) Assignee: NTN Corporation (JP)

( * ) Notice: Subject to any disclaimer, the term of this patent is extended or adjusted under 35 U.S.C. 154(b) by 63 days.

(21) Appl. No.: 12/009,583

(22) Filed: Jan. 18, 2008

(65) Prior Publication Data
US 2008/0169141 A1 Jul. 17, 2008

Related U.S. Application Data

(63) Continuation of application No. PCT/JP2006/314035, filed on Jul. 14, 2006.

(30) Foreign Application Priority Data
Jul. 19, 2005 (JP) ............................. 2005-208778

(51) Int. Cl.
*B60K 1/00* (2006.01)
(52) U.S. Cl. ..................... 180/65.5; 180/65.6
(58) Field of Classification Search ................ 180/65.1, 180/65.5, 65.6
See application file for complete search history.

(56) References Cited

U.S. PATENT DOCUMENTS

| | | | |
|---|---|---|---|
| 5,163,528 A * | 11/1992 | Kawamoto et al. ......... 180/65.5 |
| 5,180,180 A * | 1/1993 | Yamashita et al. .......... 180/253 |
| 5,382,854 A | 1/1995 | Kawamoto et al. |
| 5,616,097 A * | 4/1997 | Dammon .................... 475/331 |
| 5,691,584 A * | 11/1997 | Toida et al. ............... 310/67 R |
| 6,328,123 B1* | 12/2001 | Niemann et al. ........... 180/65.5 |
| 6,908,231 B2* | 6/2005 | Hagiwara ................... 384/537 |

FOREIGN PATENT DOCUMENTS

| | | |
|---|---|---|
| JP | 06-048191 A | 2/1994 |
| JP | 07-081436 | 3/1995 |
| JP | 09-132040 A | 5/1997 |
| JP | 2001-032888 | 2/2001 |
| JP | 2002-247713 | 8/2002 |
| JP | 2003-28254 A | 1/2003 |
| JP | 2005-104216 A | 4/2005 |
| WO | WO-2005/030518 A1 | 4/2005 |

* cited by examiner

*Primary Examiner*—Christopher P Ellis
*Assistant Examiner*—Brian Swenson
(74) *Attorney, Agent, or Firm*—Harness, Dickey & Pierce, P.L.C.

(57) ABSTRACT

A motor-driven wheel driving apparatus has two planetary reduction gear mechanisms arranged within the outer member, forming a part of the wheel bearing. The apparatus is positioned at the outboard side end of the inner member.

11 Claims, 7 Drawing Sheets

MOTOR-DRIVEN WHEEL DRIVING APPARATUS

CROSS-REFERENCE TO RELATED APPLICATIONS

This application is a continuation application of International Application No. PCT/JP2006/314035, filed Jul. 14, 2006, which claims priority to JP 2005-208778, filed Jul. 19, 2005. The disclosures of the above applications are incorporated herein by reference.

FIELD

The present disclosure relates to a motor-driven wheel driving apparatus formed as a unit. The unit includes a wheel bearing, reduction gear means and an electric motor that is intended to be used for a vehicle such as an electric vehicle, a golf cart or a fork lift truck.

BACKGROUND

Motor-driven wheel driving apparatus has been proposed to improve the driving efficiency in cases of driving a wheel by an electric motor. Additionally, the apparatus is used to drive a wheel, e.g. of an electric vehicle, where the wheel is directly driven by the electric motor. However, such motor-driven wheel driving apparatus requires a large torque for an electric motor. Thus, it is necessary to use a large scale motor with high power. This not only increases manufacturing cost but weight of the vehicle and accordingly makes it difficult to ensure sufficient driving performance.

Additionally, motor-driven wheel driving apparatus (an in-wheel motor) equipped with a reduction gear mechanisms have been proposed. Here, an electric motor and a planetary reduction gear are arranged within a space inside a wheel. The rotational output of the electric motor is transmitted to the wheel via the planetary reduction gear mechanism (see e.g. Japanese Patent Publication No. 3440082).

When adopting the planetary reduction gear mechanism as the reduction gear mechanism, its output shaft to transmit the rotational output of the electric motor to the wheel, via the planetary reduction gear mechanisms, has to take out its output with coinciding its axial center to that of the motor shaft after once having been divided in the axial direction of the motor-driven wheel driving apparatus. Accordingly, problems exist in such an apparatus in that its structure is difficult to assemble and the strength against inclination of the wheel during running of the vehicle is low due to the supporting span of the output shaft must be reduced.

In order to solve these problems, a known motor-driven wheel driving apparatus is shown in FIG. 8. The motor-driven wheel driving apparatus 51 has an electric motor 54 and a reduction gear mechanism 55 inside a wheel 53 on which a tire 52 is mounted. The wheel 53 can be driven by rotational output of the electric motor 54.

The electric motor 54 has a stator 57 secured to a side of a case 56 arranged inside the wheel 53. A rotor 58 is arranged opposite to the stator 57. An output shaft 59, within the rotor, transmits the rotational output of the rotor 58 to the wheel 53 via the reduction gear mechanism 55. The stator 57 and the rotor 58 are secured to a side of the case 56 and are sandwiched by covers 60 and 61 to form the electric motor 54.

One end 59a of the output shaft 59 is integrally formed with a mounting flange 62. The wheel 53 is secured, via hub bolts 63, to the flange 62. The end 59a of the output shaft 59 is rotatably supported by a rolling bearing 64 within a shaft insert aperture 56b of the case 56. The other end 59b is also rotatably supported by a rolling bearing 65 within a central recess 60a of the outer cover 60.

The reduction gear mechanism 55, within the case 56, is formed by a plurality of gears 55a, 55b, 55c and 55d. A first gear 55a is arranged coaxially and integrally formed with the end of the rotor 58. Second and third gears 55b and 55c are secured on the same supporting shaft 66 and thus rotate simultaneously. The second gear 55b and the first gear 55a mesh with each other. One end 66a of the supporting shaft 66 is rotatably supported by a rolling bearing 67 within a recess 61a in the inner cover 61. The other shaft end 66b is also rotatably supported by a rolling bearing 68 within a recess 56a of the case 56. The force gear 55d is secured on the output shaft 59 and meshes with the third gear 55c.

According to such a structure, the output shaft 59 of the electric motor 54 is rotatably supported at opposite ends of the case 56. The shaft 59 is passed through the aperture center of rotation of the fourth gear 55d, which is a final stage of the reduction gear means 55. Also, the shaft 59 is passed through the shaft inserting aperture 58a of the rotor 58. Thus, the apparatus can be easily assembled by sequentially fitting the structural parts of the reduction gear mechanism 55, the inner cover 61, the structural parts of the electric motor 54, and the outer cover 60 onto the output shaft 59 by using it as a reference part. In addition since the output shaft 59 is supported at substantially opposite ends of the motor-driven wheel driving apparatus 51, it is possible to ensure the supporting span of the output shaft 59. Thus, it is possible to obtain a sufficient supporting strength against the inclination of wheel during running of the vehicle (see Japanese Laid-open Patent Publication No. 81436/1995).

In such a motor-driven wheel driving apparatus, while the reduction gear mechanism 55 can easily assemble various structural parts, the installation space for the rolling bearings 64 and 65 for supporting the output shaft 59 is limited. This is due to the electric motor 54 of high rotational output requiring a large mounting space. Accordingly, the loading capacity against the inclination of the wheel 53 during running of the vehicle, against the moment load, becomes insufficient. Thus, it has become necessary to improve the durability of the rolling bearings 64 and 65.

SUMMARY

It is therefore an object of the present disclosure to provide a motor-driven wheel driving apparatus that can solve the problems of the prior art. It is desirable to improve the durability of the wheel bearing, reduce the weight and size of the apparatus, and make it easy to assemble and disassemble the apparatus.

In order to achieve the object, a motor-driven wheel driving apparatus comprises a driving section with a double row wheel bearing, planetary reduction gear mechanism, an electric motor, and a cylindrical supporting member to support the electric motor. The wheel bearing has an outer member integrally formed with a wheel mounting flange on its outer circumference and with a double row outer raceway surfaces. An inner member includes a first inner ring member formed with one inner raceway surface arranged opposite to one outer raceway surface. The inner member also has an integrally formed cylindrical portion of smaller diameter axially extending from the one inner raceway surface. A second inner ring member is press fit onto the cylindrical portion of smaller diameter of the first inner ring member. The second inner member is formed with another inner raceway surface arranged opposite to the other outer raceway surface. The second inner member also has an integrally formed cup-shaped stator housing that extends radially outward from an inboard side end of the other inner raceway surface. A plurality of rolling elements is rollably arranged between the outer and inner raceway surfaces, respectively, of the outer and inner members.

The planetary reduction gear mechanism comprises an output element mounted on the outer member; input elements torque-transmittably arranged at an outboard side end of the supporting member; and a plurality of planetary elements rotatably supported on supporting pins secured on the first inner ring member. The planetary elements are adapted to engage input elements and output elements.

The driving section comprises the electric motor that includes a stator section secured on an inner circumferential surface of the stator housing. A rotor section is secured on the outer circumferential surface of the supporting member. The rotor opposes the stator section, via a predetermined radial gap. The supporting member is rotatably supported relative to shaft portions of the inner member, via a pair of rolling bearings, to transmit the rotation of the electric motor to the outer member so as to drive the wheel.

A motor-driven wheel driving apparatus comprises a driving section with a double row wheel bearing, planetary reduction gear mechanism, an electric motor, and a cylindrical supporting member to support the electric motor. The wheel bearing has an outer member integrally formed with a wheel mounting flange on its outer circumference and with double row outer raceway surfaces. An inner member includes a first inner ring member formed with one inner raceway surface and arranged opposite to one of the outer raceway surfaces. The first inner ring member is integrally formed with a cylindrical portion of smaller diameter that axially extends from the one inner raceway surface. A second inner ring member is press fitted onto the cylindrical portion of smaller diameter of the first inner ring member. The second inner ring member is formed with another inner raceway surface arranged opposite to the other outer raceway surface. The second inner ring member is integrally formed with a cup-shaped stator housing that extends radially outward from an inboard side end of the other inner raceway surface. A plurality of rolling elements is rollably arranged between the outer and inner raceway surfaces, respectively, of the outer and inner members.

The planetary reduction gear mechanism comprises a stationary element mounted on the first inner ring member. Input elements are torque-transmittably arranged at an outboard side end of the supporting member. A plurality of planetary elements engages the input elements and the stationary element. An output element supports the planetary elements rotatably relative to a carrier.

The driving section comprises the electric motor with a stator section secured on an inner circumferential surface of the stator housing. A rotor section is secured on the outer circumferential surface of the supporting member opposing the stator section, via a predetermined radial gap. The supporting member is rotatably supported relative to shaft portions of the inner member, via a pair of rolling bearings. The carrier is torque transmittably connected to the outer member to transmit the rotation of the electric motor to the outer member so as to drive the wheel.

The planetary reduction gear mechanism is arranged within the outer member to form a part of the wheel bearing at the outboard side end of the inner member. Thus, it is possible to reduce the weight, size and unsprung weight of the apparatus. In addition it is possible to improve the durability of the apparatus by keeping a sufficient space of the wheel bearing and to suppress application of the offset load caused by the moment load to the planetary elements and input elements. Furthermore, it is possible to suppress noise caused by engagement of the planetary elements and input elements. In addition, since the wheel bearing planetary reduction gear mechanism and driving section can be easily separated from one another as sub units during service, it is unnecessary to exchange the whole apparatus. Thus, it is possible to contribute to resource reduction and maintenance costs.

A plurality of carrier pins are secured on the input element equidistantly in its circumferential direction. A planetary reduction gear mechanism is additionally provided. The planetary reduction gear mechanism comprises a plurality of planetary elements rotatably supported on the carrier pins. A stationary element is secured on the inner circumference of the first inner ring member. An input element projects from the outboard side end of the supporting member. The planetary elements engage the input element and stationary element. The rotation of the electric motor is transmitted to the outer member via two planetary reduction gear mechanism so as to drive the wheel. Such a structure makes it possible to obtain a remarkably large reduction ratio within a small space. Thus, this reduces the weight and size of the electric motor.

A cup-shaped motor cover is fitted on the outer cylindrical portion of the stator housing and is secured to it by securing bolts. The stator section is radially positioned and secured to the stator housing by arranging the securing bolts within semicircular axial grooves formed equidistantly in the outer circumferential direction of the stator section. Such a structure makes it possible to reduce the weight and size of the electric motor.

Seals are arranged at either side of the bearing portions. This structure makes it possible to prevent contaminant from entering into the lubricating oil of the planetary reduction gear mechanism and from entering into the wheel bearing and planetary elements without the provision of a filter. Thus, this improves durability of the bearings.

The motor-driven wheel driving apparatus is structured so that it comprises a driving section with a double row wheel bearing, planetary reduction gear mechanism, an electric motor, and a cylindrical supporting member to support the electric motor. The wheel bearing comprises an outer member integrally formed with a wheel mounting flange on its outer circumference and with double row outer raceway surfaces. An inner member includes a first inner ring member formed with one inner raceway surface arranged opposite to one outer raceway surface. The first inner ring member is integrally formed with a cylindrical portion of smaller diameter that axially extends from the one inner raceway surface. A second inner ring member is press fit onto the cylindrical portion of smaller diameter of the first inner ring member. The second inner ring member is formed with another inner raceway surface arranged opposite to the other outer raceway surface. The second inner ring member is integrally formed with a cup-shaped stator housing that extends radially outward from an inboard side end of the other inner raceway surface. A plurality of rolling elements is rollably arranged between the outer and inner raceway surfaces, respectively, of the outer and inner members. Two planetary reduction gear mechanisms are arranged within the outer member to form a part of the wheel bearing at its outboard side end of the inner member. Thus, this makes it is possible to reduce the weight, size and unsprung weight of the apparatus. In addition, it is possible to improve the durability of the apparatus by keeping a sufficient space of the wheel bearing and to suppress the application of the offset load caused by the moment load to the planetary elements and input elements. Furthermore, it is possible to suppress noise caused by the engagement of the planetary elements and input elements. In addition, since the wheel bearing planetary reduction gear mechanism and driving section can be easily separated from each other as sub units during service, it is unnecessary to exchange the whole apparatus and thus it is possible to contribute to resource reduction and maintenance costs.

A motor-driven wheel driving apparatus comprises a driving section that includes a double row wheel bearing planetary reduction gear mechanism, an electric motor, and a cylindrical supporting member to support the electric motor. The wheel bearing comprises an outer member integrally formed with a wheel mounting flange on its outer circumference and with double row outer raceway surfaces. An inner member includes a first inner ring member formed with one inner raceway surface arranged opposite to one outer raceway surface. The first inner ring member is integrally formed with a cylindrical portion of smaller diameter that axially extends from the one inner raceway surface. A second inner ring member is press fit onto the cylindrical portion of smaller diameter of the first inner ring member. The second inner ring member is formed with the other inner raceway surface arranged opposite to the other outer raceway surface. The second inner ring member is integrally formed with a cup-shaped stator housing that extends radially outward from an inboard side end of the other inner raceway surface. A plurality of rolling elements is rollably arranged between the outer and inner raceway surfaces, respectively, of the outer and inner members.

The planetary reduction gear mechanism comprises a second planetary reduction gear mechanism that includes a second ring gear secured on the inner circumference of the first inner ring member. A first sun gear is formed on a projected outboard side end of the supporting member. A plurality of second planetary gears each engages the second ring gear and first sun gear. A carrier rotatably supports the second planetary gears via carrier pins. A first planetary reduction gear mechanism includes a first sun gear formed on the carrier. A first ring gear is formed on the inner circumference of the outboard side end of the outer member. A plurality of first planetary gears each engages the first ring gear and first sun gear.

The driving section comprises the electric motor that includes a stator section secured on an inner circumferential surface of the stator housing. A rotor section is secured on the outer circumferential surface of the supporting member opposing the stator section via a predetermined radial gap. The supporting member is rotatably supported relative to shaft portions of the inner member via a pair of rolling bearings to transmit the rotation of the electric motor to the outer member, via the first and second planetary reduction gear mechanism so as to drive the wheel.

Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

DETAILED DESCRIPTION

The following description is merely exemplary in nature and is not intended to limit the present disclosure, application, or uses.

Figure 1:
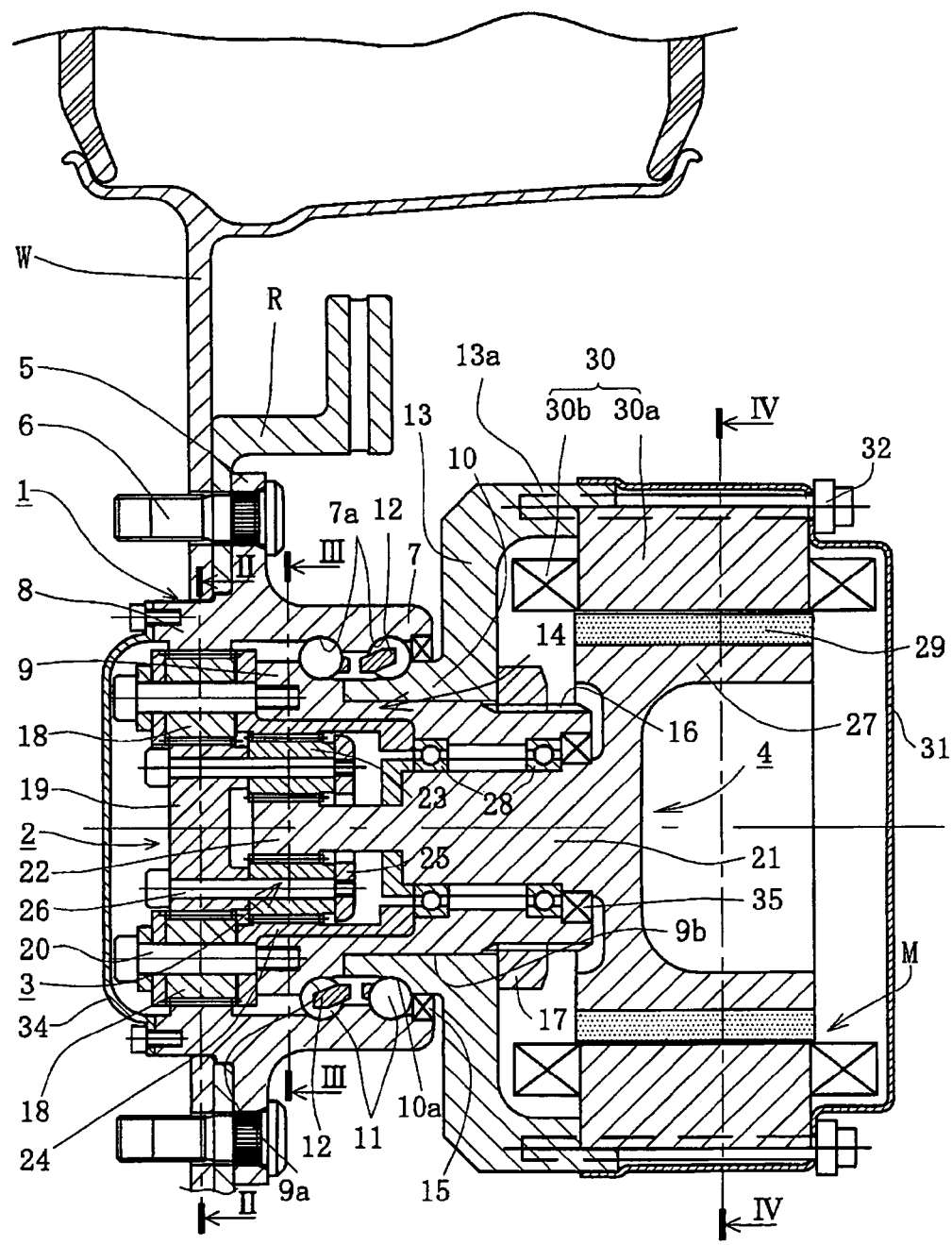
FIG. 1 is a longitudinal-section view of a first embodiment of a motor-driven wheel driving apparatus.

FIG. 1 is a longitudinal-section view of a first embodiment of a motor-driven wheel driving apparatus.

Figure 2:
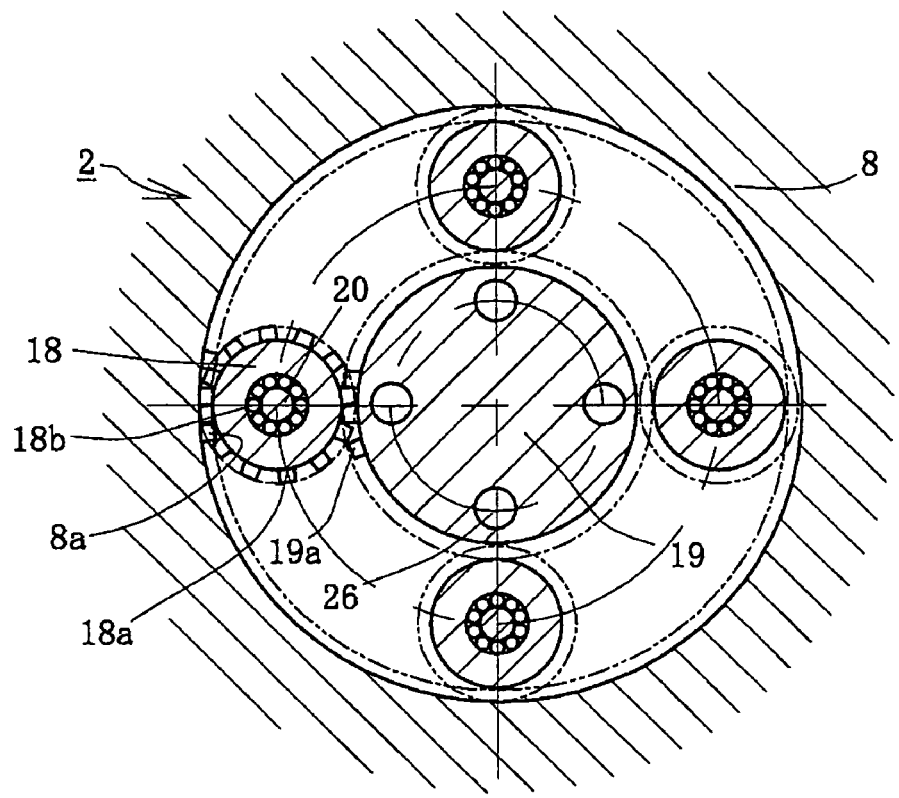
FIG. 2 is a cross-sectional view taken along line II-II of FIG. 1.
Figure 3:
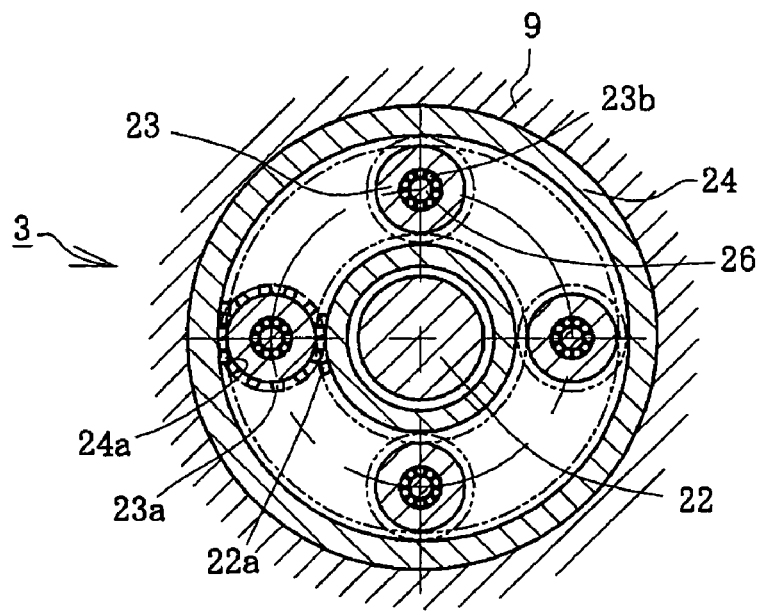
FIG. 3 is a cross-sectional view taken along line III-III of FIG. 1.
Figure 4:
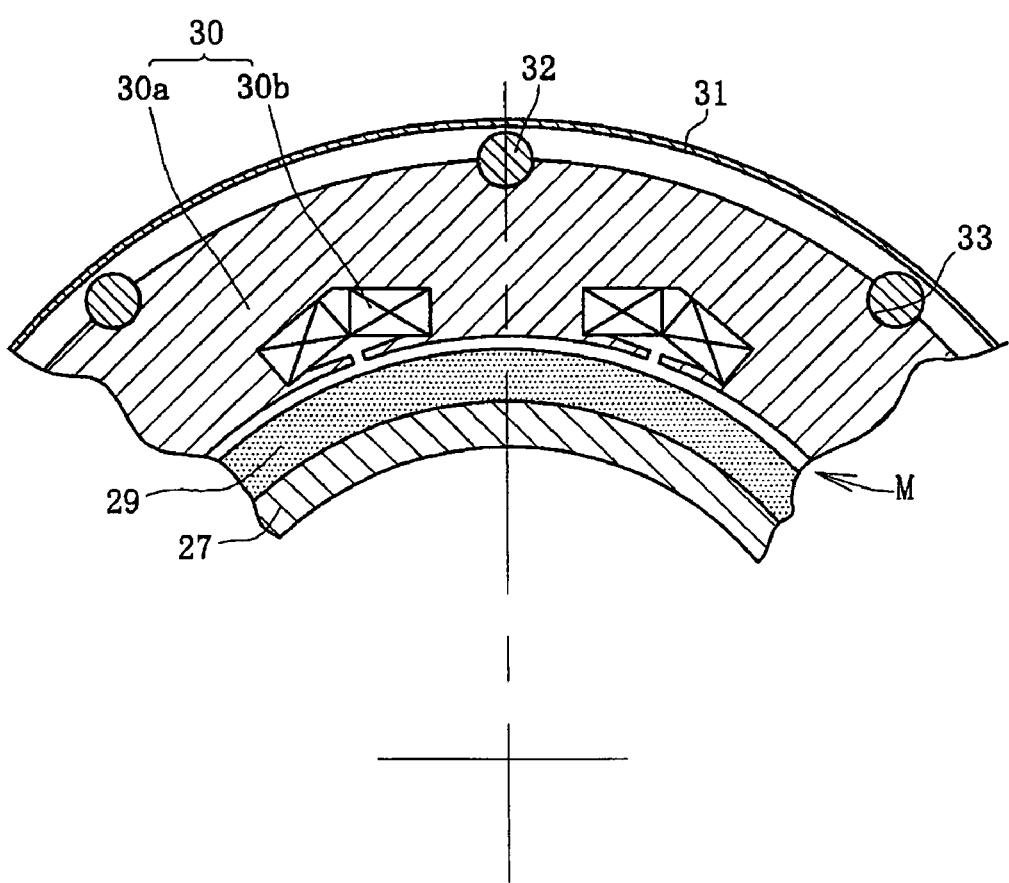
FIG. 4 is a cross-sectional view taken along line IV-IV of FIG. 1.

FIG. 2 is a cross-sectional view taken along line II-II of FIG. 1. FIG. 3 is a cross-sectional view taken along line III-III of FIG. 1. FIG. 4 is a cross-sectional view taken along line IV-IV of FIG. 1. In the description of the present disclosure, a side of a bearing positioned outward of the vehicle when it is mounted on the vehicle is referred to as the "outboard" side (the left side in a drawing). The inward side of the vehicle is referred to the "inboard" side (the right side in a drawing).

The motor-driven wheel driving apparatus has a wheel bearing 1, a first planetary reduction gear mechanism 2 arranged radially inside of the wheel bearing 1, a second planetary reduction gear mechanism 3 connected to the first planetary reduction gear means 2, and a driving section 4.

The wheel bearing 1 has an outer member 7 integrally formed with a wheel mounting flange 5 on its outer circumference to mount a wheel W and brake rotor R. Double row outer raceway surfaces 7a, 7a are formed on the outer member inner circumference. A cylindrical ring gear 8 extends toward the outboard side from the double row outer raceway surfaces 7a, 7a. A first inner ring member 9 is formed with one inner raceway surface 9a arranged opposite to one outer raceway surface 7a. The first inner ring member 9 is integrally formed with a cylindrical portion of smaller diameter 9b that axially extends from the one inner raceway surface 9a. A second inner ring member 10 is press fit onto the cylindrical portion of smaller diameter 9b of the first inner ring member 9. The second inner ring member 10 is formed with the other inner raceway surface 10a arranged opposite to the other outer raceway surface 7a. The second inner ring member 10 is integrally formed with a cup-shaped stator housing 13 that extends radially outward from an inboard side end of the other inner raceway surface 10a. Double row rolling elements 11 are rollably arranged between the outer and inner raceway surfaces. Cages 12, 12 equidistantly hold the double row rolling elements 11 in a circumferential direction. The stator section 30, described later, is secured on an outer cylindrical portion 13a of the stator housing 13. The first and second inner ring members 9, 10 form an inner member 14.

Wheel bolts 6 are arranged on the wheel mounting flange 5 of the outer member 7 equidistantly in its circumferential direction. The outer member 7 is made of medium carbon steel such as S53C including carbon of 0.40~0.80% by weight. The double row outer raceway surfaces 7a, 7a are hardened to have a surface hardness of between 54~64 HRC. It is preferable to carry out the hardening using high frequency induction hardening which can easily achieve a localized heating and setting of the depth of the hardening layer. Seal 15 is arranged at the inboard side end of the outer member 7 to prevent leakage of grease contained within the bearing apparatus as well as ingress of rain water or dust.

The first inner ring member 9 is made of medium carbon steel such as S53C including carbon of 0.40~0.80% by weight. The inner ring member 9 is hardened to have a layer with a surface hardness between 54~64 HRC from the inner raceway surface 9a to the cylindrical portion of smaller diameter 9b. It is preferable to carry out the hardening using high frequency induction hardening which can easily achieve a localized heating and setting of the depth of the hardened layer. A thread 16 is formed on the outer circumference at the end of the cylindrical portion of smaller diameter 9b. The second inner ring member 10 is axially immovable secured by a fastening nut 17. Thus, the first and second inner ring members 9, 10 are separably secured to one another.

The second inner ring member 10 is made of medium carbon steel such as S53C including carbon of 0.40~0.80% by weight. Its inner raceway surface 10a is hardened to have a layer with a surface hardness between 54~64 HRC. It is preferable to carry out the hardening using high frequency induction hardening which can easily achieve a localized heating and setting of the depth of the hardened layer. Although illustrated as an angular ball bearing using balls as the rolling elements 11, for example, a tapered roller bearing using tapered rollers may also be used.

As shown in FIG. 2 the first planetary reduction gear mechanism 2 is formed as a united structure with the outer member 7. The first planetary reduction gear mechanism 2 includes a first ring gear (output element) 8 formed with internal teeth 8a. Four first planetary gears (planetary elements) 18 are formed with external teeth 18a that mesh with the internal teeth 8a of the first ring gear 8 and move in planetary motion along the inner circumference of the first ring gear 8. A first sun gear (input element) 19 is formed with external teeth 19a that mesh with the first planetary gear 18. The first planetary reduction gear mechanism is a so-called "Star-type" planetary deduction gear mechanism where the first ring gear 8 rotates itself.

Each first planetary gear 18 is rotatably supported on a supporting pin 20 via a rolling bearing 18b. Each supporting pin 20 is threaded into the end face of the first inner ring member 9 and equidistantly in the circumferential direction through a second ring gear 24. Carrier pins 26 are arranged on the first sun gear 19 equidistantly in its circumferential direction (See FIGS. 1 and 2).

The second planetary reduction gear mechanism 3 includes a second sun gear (input element) 22 formed on the projected end of the outboard side of a spindle portion 21 of the driving section 4 (see FIG. 1). The sun gear 22 includes external teeth 22a (see FIG. 3). Four second planetary gears (planetary elements), formed with external teeth 23a, mesh with the external teeth 22a of the second sun gear 22 and move in planetary motion along the outer circumference of the second sun gear 22. A second ring gear 24, formed with internal teeth 24a, mesh with the external teeth 23a of the second planetary gear 23. Each second planetary gear 23 is supported on a carrier pin 26 secured on a carrier 25 (FIG. 1) via a rolling bearing 23b.

As shown in FIG. 1 the driving section 4 includes a cylindrical supporting member 27 and an electric motor M. A spindle portion 21 projects from the supporting member 27 at its center. A pair of rolling bearing 28, 28 is arranged between the spindle portion 21 and the first inner ring member 9. The supporting member 27 is rotatably supported on the inner member 14 (first and second inner ring members 9, 10) via the rolling bearings 28, 28.

A rotor section 29, including a plurality of permanent magnets, is secured on the outer circumference of the supporting member 27. A stator section 30 is arranged oppositely to the rotor section 29 via a predetermined radial gap (air gap). The stator section 30 has a stator iron core 30a and a stator coil 30b wound on the iron core 30b. The rotor section 29 and the stator section 30 form the electric motor M.

A cup-shaped motor cover 31 is mounted on a cylindrical end of the stator housing 13 of the second inner ring member 10. The cover 31 is secured by securing bolts 32. Each securing bolt 32, as shown in FIG. 4, engages in a semi-circular axial groove 33 equidistantly arranged along the outer circumference of the stator iron core 30a so as to stationarily position the stator section 30 in a radial direction. Such a structure makes it possible to reduce the weight and size of the electric motor M.

To energize the electric motor M, the supporting member 27 on which the rotor section 29 is secured is rotated. The rotation of the supporting member 27 causes planetary motion of the second planetary gears 23. The rotation is transmitted to the first sun gear 19, via carrier pins 26, after reduction. The rotation of the first sun gear 19 is transmitted to the first ring gear 8, via the first planetary gear 18, and to the outer member 7, after further reduction.

The reduction ratio of the first and second planetary reduction gear mechanism 2, 3 can be appropriately changed by changing the number of teeth of the first and second planetary gears 18, 23 and a ratio of the number of gear teeth of the first and second ring gears 8, 24. The total reduction ratio can be determined by a product of the reduction ratio "m" of the first planetary reduction gear mechanism 2 and the reduction ratio "n" of the second planetary reduction gear mechanism 3, that is "m×n". Accordingly, a remarkably large reduction ration can be obtained within a small space. Thus, the weight and size of the electric motor M can be substantially reduced.

According to the first embodiment, the first and second planetary reduction gear mechanisms 2, 3 are arranged within an opening of the outboard side of the outer member 7 to form the wheel bearing 1. Thus, it is possible to obtain a sufficient space for the bearing section and to achieve easy assembly of the bearing section. In addition, the first and second planetary reduction gear mechanisms 2, 3 can uniformly support the moment load using their double row wheel bearing 1. Thus, it is possible to suppress the application of the offset load to the first and second planetary gears 18, 23 and the first and second sun gears 19, 22. In addition, since the electric motor M is separably united to the second inner ring member 10 to form the inner member 14, via the stator housing 13, it is possible to reduce the axial size of the apparatus. Furthermore, the wheel bearing 1, first and second planetary reduction gear mechanisms 2, 3, and the driving section 4 can be easily separated and exchanged as sub units and thus it is unnecessary to exchange the whole apparatus. This contributes to resource savings and reduction of the maintenance costs.

Opened ends of the wheel bearing 1 are closed by a cup-shaped cover 34 secured onto the outboard side end of the outer member 7. A seal 35 is arranged at the inboard side end of the inner member, an end of the cylindrical portion of smaller diameter 9b of the first inner ring member 9. This makes it possible to use the same lubricating oil for lubricating all the wheel bearing 1, the first and second planetary reduction gear mechanism 2, 3 and the pair of rolling bearing 28, 28 to support the supporting member 27. It is also possible to separately lubricate the first and second planetary reduction gear mechanisms 2, 3, the wheel bearing 1, the pair of rolling bearings 28, 28 by grease lubricating only the bearings 1, 28, 28 while arranging seals (not shown) at both ends of the bearings 1, 28, 28 and by oil lubricating only the first and second planetary reduction gear mechanism 2, 3. This makes it possible to prevent ingress of contaminants mingled with the lubricating oil into the first and second planetary reduction gear mechanism 2, 3 and thus to improve the durability of the bearings.

Although it is shown in the illustrated embodiment that the first and second reduction mechanism 2, 3 are gear reduction mechanism it will be appreciated to those skilled in the art that the first and second reduction mechanism 2, 3 may be friction reduction mechanism (traction drive). This friction drive can substantially reduce noise and vibration generated during transmission of power.

Figure 5:
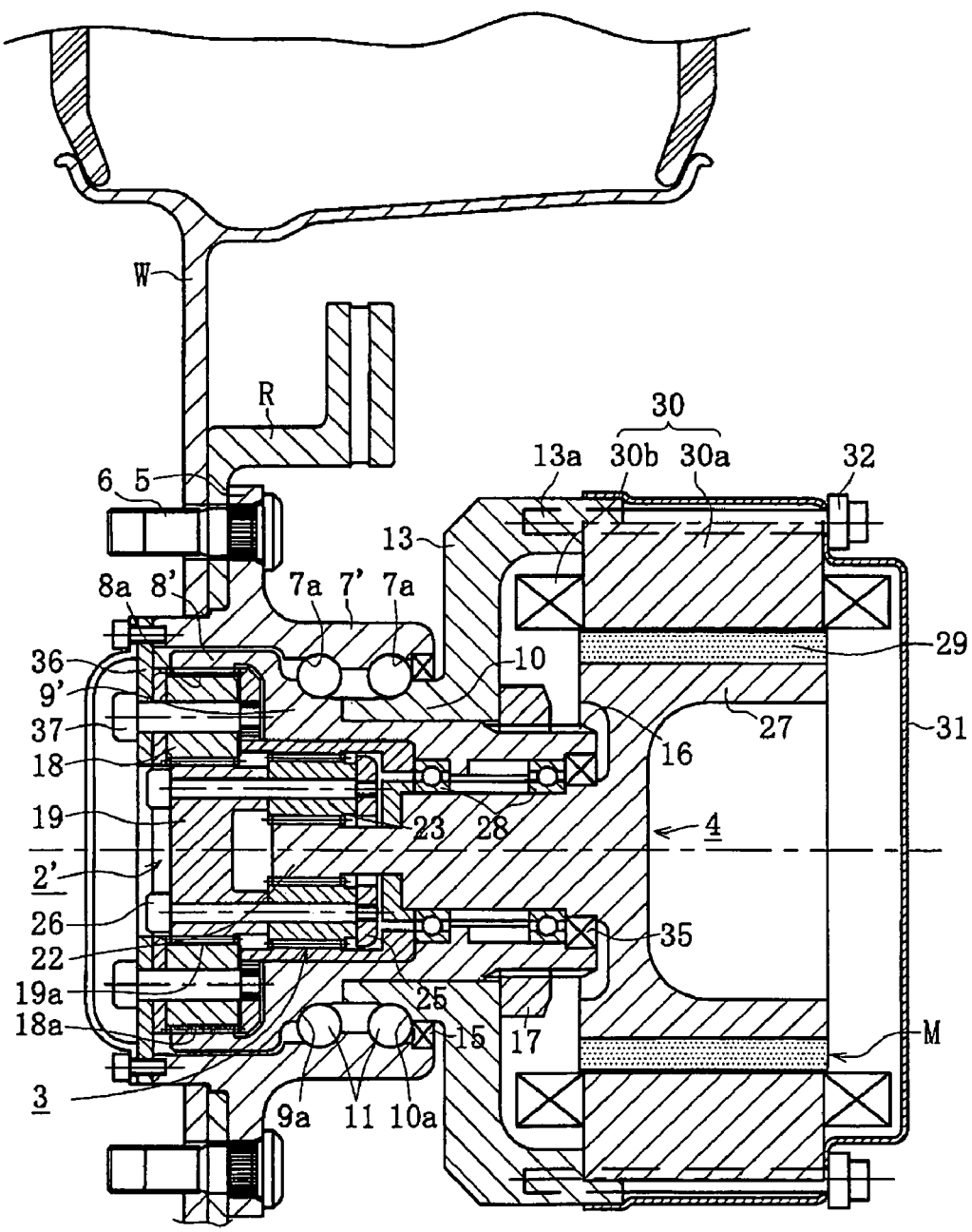
FIG. 5 is a longitudinal-section view of a second embodiment of a motor-driven wheel driving apparatus.

FIG. 5 is a longitudinal-section view of a second embodiment of a motor-driven wheel driving apparatus. Difference between this embodiment and from the first embodiment only resides in the structure of the planetary reduction gear mechanism. More particularly, the first planetary reduction gear has the same numerals as those used in the first embodiment to designate the same structural elements and a detail description of them will be omitted.

A first planetary reduction gear mechanism 2' includes a first ring gear (output element) 8' formed integrally with a first inner ring member 9' and includes internal teeth 8a. Four first planetary gears (planetary elements) 18 move in planetary motion along the inner circumference of the first ring gear 8'. The first sun gear (input element) 19 is formed with external teeth 19a that mesh with the first planetary gears 18. The first planetary gears 18 are rotatably supported on the carrier pins 37 secured on the carrier 36 secured on the outer member 7'.

When energizing the electric motor M, the supporting member 27 on which the rotor section 29 is secured is rotated. The rotation of the supporting member 27 causes planetary motion of the second planetary gears 23. The rotation is transmitted to the first sun gear 19 via carrier pins 26, after reduction (first stage). The rotation of the first sun gear 19 is transmitted to the carrier 36, via the first planetary gear 18 meshing the first ring gear 8' after further reduction. Finally, rotation is transmitted to the outer member 7'.

Figure 6:
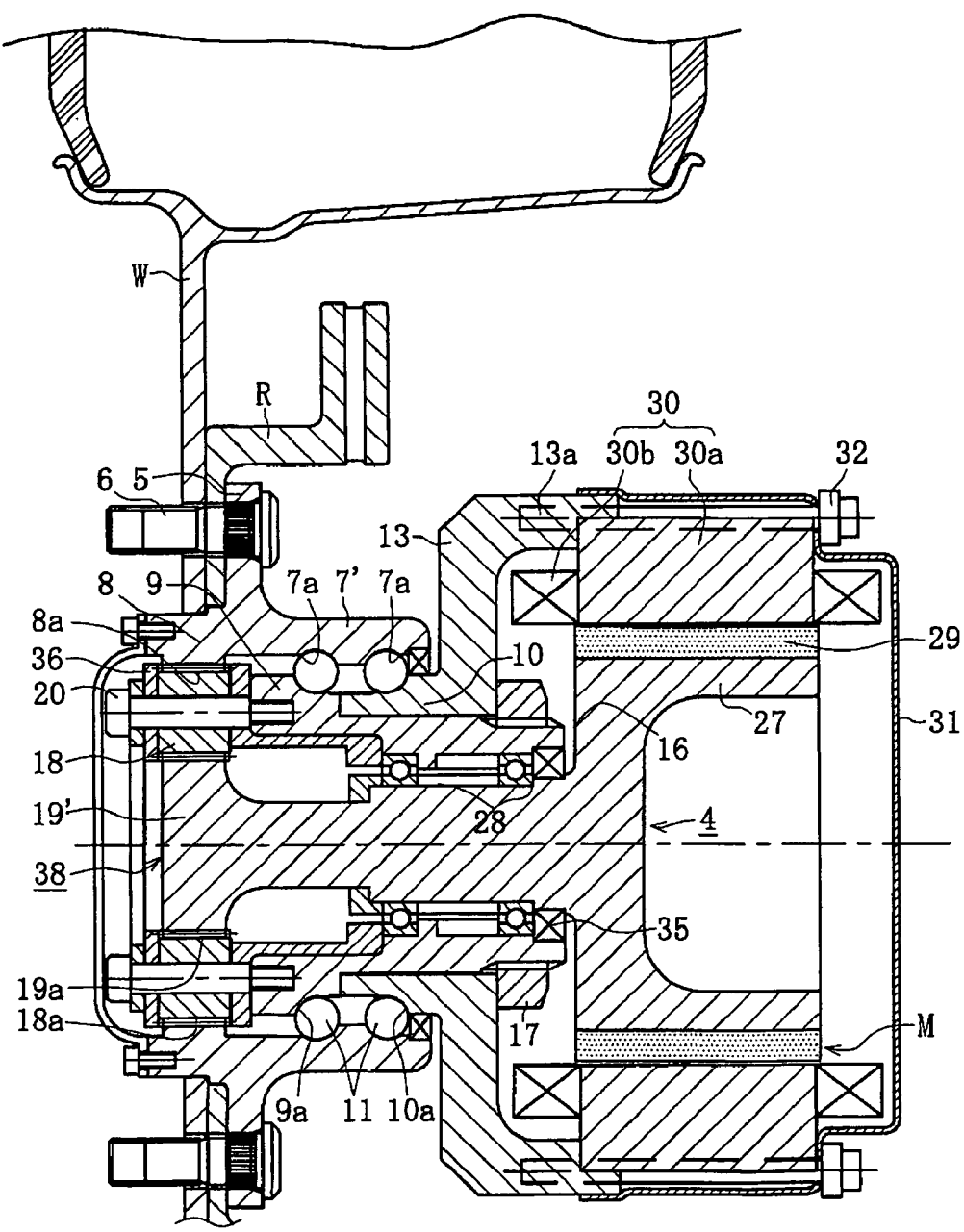
FIG. 6 is a longitudinal-section view of a third embodiment of a motor-driven wheel driving apparatus.

FIG. 6 is a longitudinal-section view of a third embodiment of a motor-driven wheel driving apparatus. The third embodiment is a modification of the first embodiment. It includes a single stage planetary reduction gear mechanism. Thus, the same numerals are used herein as those used in the previous embodiments to designate the same structural elements.

The planetary reduction gear mechanism of this motor-driven wheel driving apparatus is basically structured with only a one stage planetary reduction gear mechanism 2 with the second planetary reduction gear 3 in the first embodiment (FIG. 1) being omitted. This planetary reduction gear mechanism 38 includes the first ring gear (output element) 8 formed integrally with the outer member 7 and with internal teeth 8a. Four first planetary gears (planetary elements) 18 move in planetary motion along the inner circumference of the first ring gear 8. A sun gear (input element) 19', formed with external teeth 19a, meshes with the first planetary gears 18. The sun gear 19' is formed integrally with the spindle portion 21.

When energizing the electric motor M, the supporting member 27, on which the rotor section 29 is secured, is rotated. Rotation of the supporting member 27 causes rotation of the sun gear 19', via the spindle portion 21. Rotation of the sun gear 19' is transmitted to the first ring gear 8, via the first planetary gears 18. Finally, the rotation is transmitted to the outer member 7 after reduction.

Figure 7:
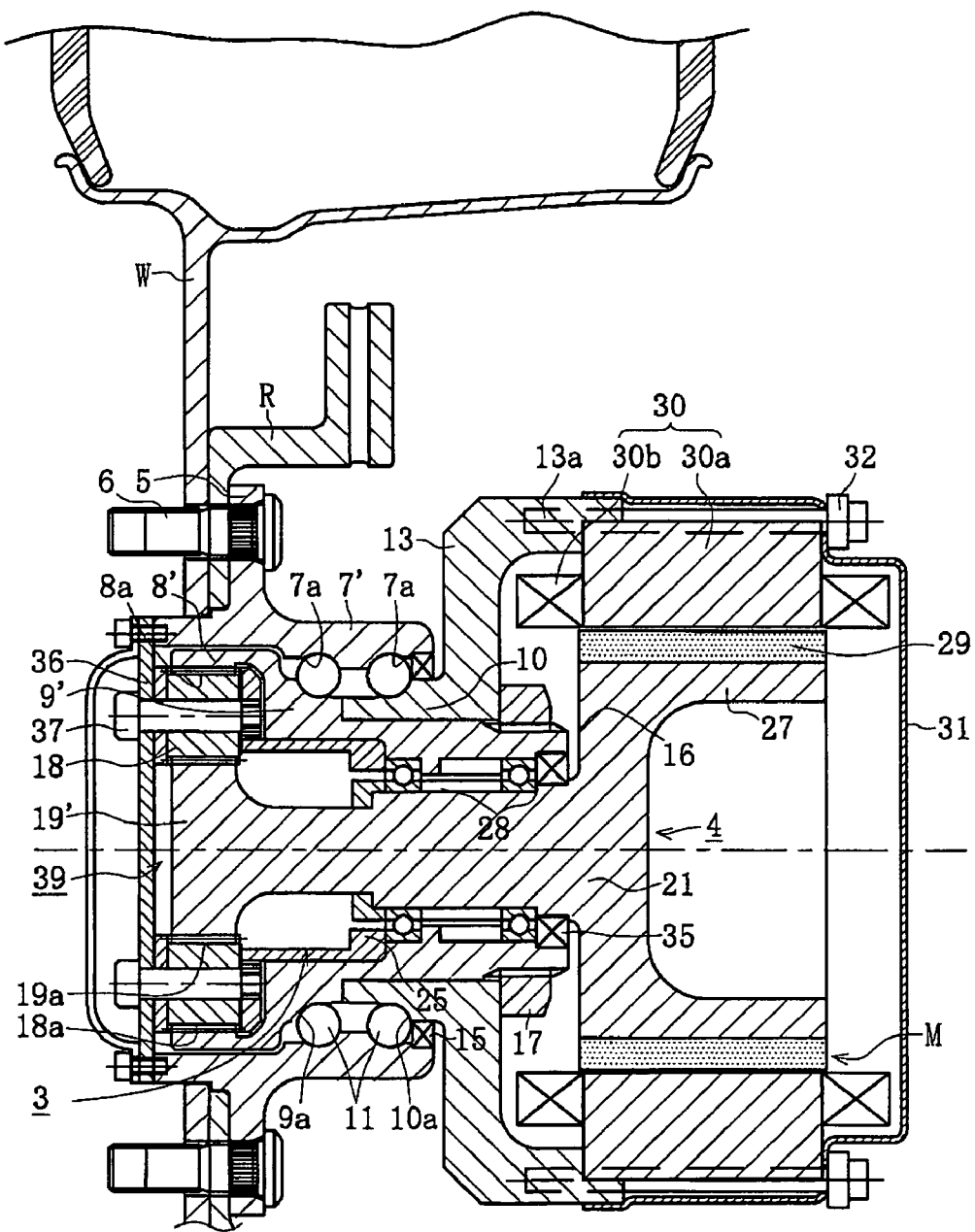
FIG. 7 is a longitudinal-section view of a fourth embodiment of a motor-driven wheel driving apparatus.
Figure 8:
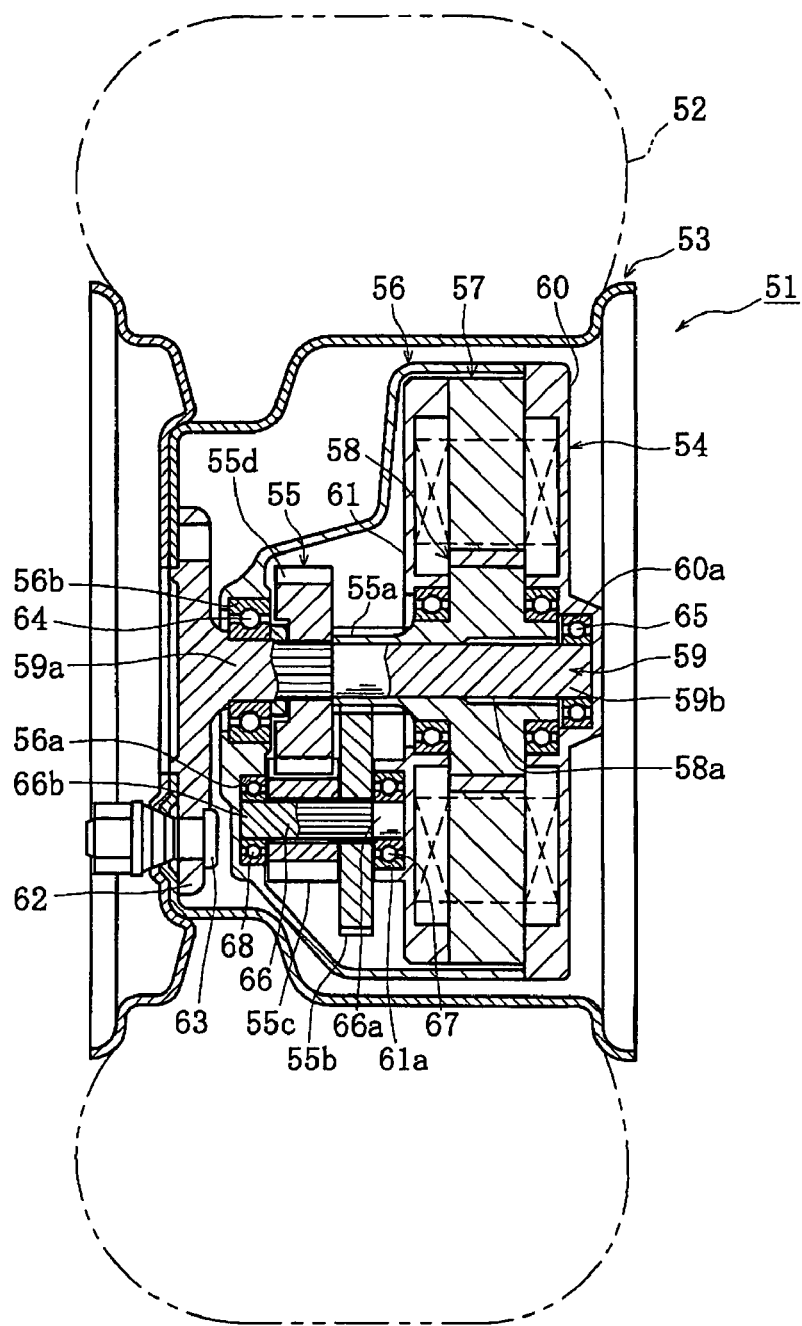
FIG. 8 is a longitudinal-section view of a motor-driven wheel driving apparatus of the prior art.

FIG. 7 is a longitudinal-section view of a fourth embodiment of a motor-driven wheel driving apparatus. The fourth embodiment is a modification of the second embodiment. It includes a single stage planetary reduction gear mechanism. Thus, the same numerals are used herein as those used in the previous embodiments to designate the same structural elements.

The planetary reduction gear mechanism of this motor-driven wheel driving apparatus is structured with only a single stage planetary reduction gear mechanism 2' with the second planetary reduction gear 3 in the first embodiment of the second embodiment (FIG. 5) being omitted. This planetary reduction gear mechanism 39 includes the first ring gear (output element) 8' formed integrally with the first inner ring member 9' and with internal teeth 8a. Four first planetary gears (planetary elements) 18, formed with external teeth 18, mesh with the internal teeth 8a of the first ring gear 8' and move in the planetary motion along the inner circumference of the first ring gear 8'. The sun gear (input element) 19', formed with external teeth 19a, meshes with the first planetary gears 18. The sun gear 19' is formed integrally with the spindle portion 21.

When energizing the electric motor M, the supporting member 27, on which the rotor section 29 is secured, is rotated. Rotation of the supporting member 27 causes rotation of the sun gear 19', via the spindle portion 21. Rotation of the sun gear 19' is transmitted to the carrier 36, via the first planetary gears 18, after reduction. Finally, rotation is transmitted to the outer member 7'.

The motor-driven wheel driving apparatus can be applied to various kinds of vehicles such as 4-wheeled vehicles, a fuel cell car, electric cars, motorcycles, golf carts, 3 or 4 wheeled carts for aged or physically handicapped persons, handy carts used in construction or transport fields and other motor-driven wheel driving apparatus used in electrically powered vehicles.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A motor-driven wheel driving apparatus comprising:
a driving section including a double row wheel bearing, planetary reduction gear mechanisms, an electric motor, and a cylindrical supporting member for supporting said electric motor;
said wheel bearing including an outer member integrally formed with a wheel mounting flange on its outer circumference and formed with double row outer raceway surfaces;
an inner member includes a first inner ring member formed with one inner raceway surface arranged opposite to one outer raceway surface, said inner ring is integrally formed with a cylindrical portion of smaller diameter axially extending from said one inner raceway surface, a second inner ring member is press fit onto said cylindrical portion of smaller diameter of said first inner ring member and formed with another inner raceway surfaces arranged opposite to the other outer raceway surface, said second inner ring member integrally formed with a cup-shaped stator housing extending radially outward from an inboard side end of said other inner raceway surface;
a plurality of rolling elements rollably arranged between said outer and inner raceway surfaces, respectively, of said outer and inner members;
said planetary reduction gear mechanism including an output element mounted on said outer member and input elements torque-transmittably arranged at an outboard side end of said supporting member;
a plurality of planetary elements rotatably supported on supporting pins secured on said first inner ring member and adapted to engage said input elements and said output element;
said driving section including said electric motor including a stator section secured on an inner circumferential surface of said stator housing, and a rotor section secured on the outer circumferential surface of said supporting member opposing said stator section via a predetermined radial gap; and
said supporting member being rotatably supported relative to shaft portions of said inner member via a pair of rolling bearings to transmit the rotation of said electric motor to said outer member so as to drive the wheel.

2. The motor-driven wheel driving apparatus of claim 1, wherein a plurality of carrier pins are equidistantly in its circumferential direction secured on said input element, a second planetary reduction gear mechanism is additionally provided, said second planetary reduction gear mechanism including a plurality of planetary elements rotatably supported on said carrier pins, a stationary element secured on the inner circumference of said first inner ring member, and an input element projecting from the outboard side end of said supporting member, said planetary elements engaging with said input element and stationary element, and rotation of said electric motor being transmitted to said outer member via two planetary reduction gear means so as to drive the wheel.

3. The motor-driven wheel driving apparatus of claim 2, wherein a cup-shaped motor cover is fitted on the outer cylindrical portion of said stator housing and secured thereto by securing bolts, and said stator section is radially positioned and secured to said stator housing by arranging said securing bolts within semicircular axial grooves formed equidistantly in the outer circumferential direction of said stator section.

4. The motor-driven wheel driving apparatus of claim 2, wherein seals are arranged at either side of said bearing portions.

5. The motor-driven wheel driving apparatus of claim 1, wherein a cup-shaped motor cover is fitted on the outer cylindrical portion of said stator housing and secured thereto by securing bolts, and said stator section is radially positioned and secured to said stator housing by arranging said securing bolts within semicircular axial grooves formed equidistantly in the outer circumferential direction of said stator section.

6. The motor-driven wheel driving apparatus of claim 5, wherein seals are arranged at either side of said bearing portions.

7. The motor-driven wheel driving apparatus of claim 1, wherein seals are arranged at either side of said bearing portions.

8. A motor-driven wheel driving apparatus comprising:
a driving section including a double row wheel bearing, planetary reduction gear mechanism, an electric motor, and a cylindrical supporting member for supporting said electric motor;
said wheel bearing including an outer member integrally formed with a wheel mounting flange on its outer circumference and formed with double row outer raceway surfaces;
an inner member including a first inner ring member formed with one inner raceway surface arranged opposite to one outer raceway surface and integrally formed with a cylindrical portion of smaller diameter axially extending from said one inner raceway surface, a second inner ring member press fit onto said cylindrical portion of smaller diameter of said first inner ring member and formed with another inner raceway surfaces arranged opposite to the other outer raceway surface, said second inner ring member integrally formed with a cup-shaped stator housing extending radially outward from an inboard side end of said other inner raceway surface;
a plurality of rolling elements rollably arranged between said outer and inner raceway surfaces, respectively, of said outer and inner members;
said planetary reduction gear mechanism including:
a stationary element mounted on said first inner ring member;
input elements torque-transmittably arranged at an outboard side end of said supporting member;
a plurality of planetary elements engaging said input elements and said stationary element;
an output element supporting said planetary elements rotatably relative to a carrier;
said driving section including:
said electric motor including a stator section secured on an inner circumferential surface of said stator housing, and a rotor section secured on the outer circumferential surface of said supporting member opposing said stator section via a predetermined radial gap; and
said supporting member being rotatably supported relative to shaft portions of said inner member via a pair of rolling bearings and said carrier being torque-transmittably connected to said outer member to transmit the rotation of said electric motor to said outer member so as to drive the wheel.

9. The motor-driven wheel driving apparatus of claim 8, wherein a plurality of carrier pins are equidistantly in its circumferential direction secured on said input element, a second planetary reduction gear mechanism is additionally provided, said second planetary reduction gear mechanism including a plurality of planetary elements rotatably supported on said carrier pins, a stationary element secured on the inner circumference of said first inner ring member, and an input element projecting from the outboard side end of said supporting member, said planetary elements engaging with said input element and stationary element, and rotation of said electric motor being transmitted to said outer member via two planetary reduction gear means so as to drive the wheel.

10. The motor-driven wheel driving apparatus of claim 8, wherein a cup-shaped motor cover is fitted on the outer cylindrical portion of said stator housing and secured thereto by securing bolts, and said stator section is radially positioned and secured to said stator housing by arranging said securing bolts within semicircular axial grooves formed equidistantly in the outer circumferential direction of said stator section.

11. The motor-driven wheel driving apparatus of claim 2, wherein seals are arranged at either side of said bearing portions.

* * * * *